Patented Jan. 17, 1939

2,144,371

UNITED STATES PATENT OFFICE 2,144,371

EDIBLE DUSTING POWDER

Carroll L. Griffith and Lloyd A. Hall, Chicago, Ill., assignors to The Griffith Laboratories, Inc., Chicago, Ill., a corporation of Illinois No Drawing. Application March 13, 1937, Serial No. 130,689

4 Claims. (Cl. 99—92)

The present invention relates to food materials, and particularly to edible dusting powders for doughnuts, pies, pastries, and the like, and to a fat mixture for making such powders. It has more special reference to so-called "doughnut sugars", or sweet white powders sprinkled onto fresh doughnuts.

Such powders are an outgrowth of sprinkling greasy foods with powdered sugar. Grease from the food spotted powdered sugar, and moisture from doughnuts was heretofore absorbed by such raw sugar with complete or partial dissolution, making an unsightly appearance. Attempts to overcome such defects gave rise to use of prepared dusting powders formulated to minimize uneven spotting by grease, and alteration of appearance by moisture. Formerly, doughnuts were offered for sale in bulk or boxes which allowed air circulation or venting. Now, wrapping in airtight cellophane or waxed wrappers causes sweating, particularly at summer temperatures. More or less commercial success has attended such products, but difficulties have not been entirely overcome.

The present invention provides a dusting powder for such foods, and has for objects the compounding of a suitable fat mixture for the purpose, the compounding of the fat mixture with a vehicular powder therefor, and the preparation of a sweet dusting powder particularly suited for the exacting requirements of doughnuts.

In experiments to devise a satisfactory dusting powder, such as the fat-covered sweet white powders used on doughnuts and the like, we have found that the nature of the fat has a critical bearing upon the success of the powder. A doughnut sugar which is satisfactory under one set of conditions may not be satisfactory under another set of conditions. Heretofore, we have not been able to find or to make a doughnut sugar which is satisfactory for all the required commercial conditions.

A freshly fried doughnut has an internal temperature of around 195° F., and contains about 25% moisture. It rapidly begins to lose moisture by evaporation. As the doughnut cools the rate of loss decreases and the doughnut dries out if not confined. One way now used to keep doughnuts fresh is to seal them individually or collectively in bags, wrappers, or more or less tight boxes. To keep doughnuts fresh appearing and attractive, powdered sugar or some sweet white powder preparation is dusted on them. Fat-covered sugar or starch or mixtures of starch and sugar have been used to protect the sugar or starch from action of moisture and fat from the doughnut, or moisture from the air. The predominant trouble is dissolving of sugar in water taken up from the doughnut. A secondary trouble is loss of whiteness in sugar or starch by unequal absorption of grease and also perhaps moisture.

We have found that known sugar-base preparations which are satisfactory at 70° to 75° F. are not satisfactory at 90° to 100° F., which temperatures are normally attained in summer. Also, sugars which are satisfactory on doughnuts exposed to the air, are not satisfactory on sealed doughnuts. We have found that the melting point or congealing point of the fat used is not the sole critical factor for selecting a proper oil or fat, but the type of fat, its components, and the qualities of its components are of importance.

Edible fats or oils are usually mixtures of tri-glycerides of unsaturated and tri-glycerides of saturated fatty acids, as found both in nature and in commerce. The latter may be made by hydrogenating the former, and there are various degrees of hydrogenation between the extremes of raw material and completely hydrogenated oil or fat, which is stearine. The melting point increases generally as the saturation by nature or by hydrogenation increases. Heretofore, it has been believed that the hydrogenated oils or fats were the best for the reason that they have higher melting points. That is more or less true so far as protecting the sugar is concerned, but as this advantage is gained, the fatty coated sugar becomes less adherent to the doughnut and to itself and the powder falls off, spoiling the appearance of the doughnut. Hydrogenated coconut oil melting at about 110° F. has been employed heretofore on sugar in an attempt to compromise these advantages and disadvantages. It is not satisfactory for extreme summer temperatures, or for sealed doughnuts especially in summer. Partially or completely hydrogenated sesame oil, or cotton seed oil, as described in Griffith Patent No. 2,012,506, is likewise unsatisfactory in extreme summer weather for all the conditions of use encountered. The best product is the one having no objectionable limitations in usage.

Our experiments have determined that the melting point of the fat is not a critical determinant, and is only a result of the use of mixed fats of various high, medium and low melting points. A mixture may be made to have such a character that one component is sure to be solid and one component is sure to be liquid or semi-solid at the same time. However, this must be done by choice of the components such that one can solidify or crystallize out of another which may be liquid or semi-solid. When used in a dusting powder we believe this to occur in such a way that the liquid oozes to the surface of a coated particle to give adherence for building up a heavy coat on a doughnut, also to give oil-fluidity or softness at the surface of each coated particle, to act as a fluid seal thereover, and further to give fat-solidity and impregnability inside such fluid or soft coat, but over the surface of the ultimate sugar or starch or other particle. We finally discovered that the highly hydrogenated fats alone were unsuitable in being too solid, that is, in having too much high melting material with too little or no low melting fats or oils. We also finally discovered that partially hydrogenated fats or oils alone were unsuitable in that they lacked a sufficient quantity of either or both the lower melting and the higher melting ingredients. And we finally discovered that the best results were obtained by having present a considerable quantity of high melting fat to be solid at the very high temperatures encountered in use of the powder, and a considerable quantity of low melting oil or fat to be liquid or semi-solid at the lower temperatures encountered in use of the powder. And further than this, we found that in addition to these requirements we could add other fat when it did not interfere with these functions of the said high-melting and low-melting fats. Such other fats were found to be fats of melting point intermediate between the high and low melting fats, and are represented by partially hydrogenated vegetable oils.

High-melting point fat is readily obtainable as stearine, preferably by complete hydrogenation of vegetable oils. Low-melting fat or oil is obtainable but is quite complex as a mixture of various constituents. Oleo oil is an example of low melting oil which is found in the market in various grades. It is derived from beef tallow, is normally like butter in its consistency, and is a mixture of tri-glycerides of saturated and unsaturated fatty acids. When oleo oil is slowly cooled, a fractional content of its components separates, forming grains, or crystals, and oil pockets. Lack of smoothness characterizes this solid or semi-solid product, and it is said to be grainy or lumpy, and a low grade for some commercial uses. The solid material, however, can be separated and is known as oleo stearin. Such separation may be effected by graining or seeding at a lower temperature and for a longer time than ordinarily used in preparing commercial grades of oleo oil from beef tallow. This gives a solid of so-called oleo stearine containing solid palmitin, and also a more fluid portion as a special grade of oleo oil, which can be removed from the oleo stearine. This oleo oil is then cooled on a refrigerated smooth steel cylinder similar to what is known in the packing industry as a lard roll, and is scraped off as a smooth homogeneous semi-solid oleo oil. It is generally characterized as follows:

Table I

Moisture _____ per cent__ 0
Stability (bubbling test at 100° F.)
    hours plus__ 7
Free fatty acid (calculated as oleic acid)
    per cent__ 0.30
Congealing point (about) _____°F__ 64.2
Melting point (capillary method) _°F__ 93 to 94.5
Iodine value (Hanus) _____ 48 to 49
Unsaturated fatty acids (present as glycerides) _____ per cent__ 70 to 75

Although the oleo oil as above characterized shows a melting point around 93° F., it does contain lower melting constituents, as shown by the congealing point of 64.2° F. The lower-melting ingredients are the glycerides of the unsaturated fatty acids, which are the predominant ingredients of the oil. Most fat mixtures, as distinguished from pure forms, pure stearine for example, have a melting point which is higher than a congealing point. On changing the temperature of the mixture from one to the other, the mixture may be said to be in a strained or unstable condition, and this seems to have some importance in this invention.

Besides the animal stearine there is the vegetable stearine, made by completely hydrogenating vegetable oil such as cotton seed oil to convert unsaturated oils of a nature like olein into stearine. Various degrees of hydrogenation are practiced and hence many mixtures of true stearine and less saturated glycerides are known. Vegetable stearine and hydrogenated oils are much less subject to rancidity than animal stearine. Animal stearine is a natural product associated with other fats which are highly subject to rancidity. Vegetable stearine is built up chemically by hydrogenation. In general, natural vegetable oils are not nearly as subject to rancidification as animal fats and oils. When vegetable fats are hydrogenated, this tendency to rancidification is greatly lessened, whether the process is completed or not. Therefore in selecting ingredients for a fat for a dusting powder the vegetable sources are preferred as being least subject to rancidity. The oleo oil above described is of animal origin, and some agent such as lecithin may be used to lessen the tendency to rancidify. We believe that our fat functions in the same manner under variable conditions because the oleo oil is peculiarly adapted to ooze out from between solid forms of higher-melting fat, and because higher-melting fat can solidify in the presence of lower-melting fat or oil. In using oleo oil we do so to use the low-melting property thereof and the property of separation from harder fats. But we introduce the rancidifying properties of animal fats, and hence eliminate from the oleo oil as much higher melting animal fat as we can replace by vegetable-source fats. By using a relatively large amount of high-melting point fat, such as vegetable stearine which is a relatively pure stearine, we are assured of a sharp distinction in composition between our highest-melting and our lowest-melting fats. Since we desire solid fat on the interior of a fat-coated particle, as of sugar, we need use only sufficient stearine to assure that it remains solid under the conditions encountered. The minimum will of course vary with the composition of the entire fat and with the conditions to be imposed by usage. In the same way we need a minimum of the lower melting fat to assure a liquid or semi-solid fatty surface. But we also find that there are limits, depending of course upon the entire fat composition. The preferred fat composition is compounded with some intermediate melting fat for reasons which will become apparent after the following discussion of the manner of compounding the dusting powder.

In actual practice of the invention we make first an edible fat mixture which can be used in various ways to coat or impregnate sugar or corn starch or other cereal or edible powder to be used as a base for a granular dusting powder. A single substance, such as sugar, corn starch, or gelatinized corn starch may be used, or else mixtures, as of some starch or cereal and sugar.

In the preferred practice of the invention we have found that the stearine and any intermediate melting fat, such as partially hydrogenated vegetable oil, may together constitute 90% or more of the mixture, and that when the stearine is fixed at 30%, the oleo oil gives the expected results when present in the range from 2% to 10%, and the best results on a doughnut sugar in the range of from 5% to 8%.

Example I

|  | Per cent |
| --- | --- |
| Vegetable stearine (melting point 138° to 140° F.) | 30 |
| Hydrogenated cotton seed oil (melting point 98 to 104° F.) | 68 to 60 |
| Oleo oil, like Table I | 2 to 10 |
| Anti-rancidifying agent (vegetable lecithin) | 0.10 to 0.20 |

The vegetable stearine in the formula may be varied from 25% to 35% by changing part of the hydrogenated cotton seed oil (melting point 98° to 104° F.) to vegetable stearine.

When variations of and from this edible fat mixture of Example I are used at 7% concentration on a granulated sugar, and tested under a given set of conditions on doughnuts, it may be readily determined how many hours the sugared doughnuts appear clean and fresh, and then it may be estimated how efficient is the coating at any later time. The following Table II shows in column (1) a variation of % oleo oil in or from Example I. Column (2) shows hours at which the efficiencies of column (3) were observed.

Table II

| (1) Percent oleo oil | (2) Hours | (3) Percent efficiency |
| --- | --- | --- |
| 2 | 1 | 100 |
| 2 | 2 | 50 |
| 2 | 8 | 0 |
| 3 | 3 | 100 |
| 3 | 5 | 70 |
| 3 | 12 | 40 |
| 3 | 36 | 25 |
| 5 | 8 | 100 |
| 5 | 12 | 90 |
| 5 | 16 | 75 |
| 5 | 36 | 60 |
| 7 | 9 | 100 |
| 7 | 16 | 94 |
| 7 | 36 | 85 |
| 8 | 9 | 100 |
| 8 | 16 | 96 |
| 8 | 36 | 90 |
| 10 | 7 | 100 |
| 10 | 12 | 80 |
| 10 | 36 | 40 |

In these particular instances, a selection is made for satisfying commercial demands. After 36 hours the efficiency is at least 60% where oleo oil is used at from 5% to 8% inclusive. It is to be noted that the efficiency increases as oleo oil concentration increases, but that a maximum is reached beyond which efficiency decreases. It is also pointed out that this range is obviously subject to change by change in the rest of the fat composition, by change in the conditions to be satisfied, and other factors. We have determined however, that Example I, when used in 7% concentration on starch, or sugar, or mixed starch and sugar, as in examples below, will meet the commercial doughnut trade requirements in all seasons and conditions and it is therefore the preferred embodiment of the invention without being a limitation thereof.

Example II

|  | Per cent |
| --- | --- |
| Granulated cane sugar | 93 |
| Fat mixture of Example I | 7 |
| Flavor, color, etc., as desired. | |

Example III

|  | Per cent |
| --- | --- |
| Corn starch (natural grains) | 10 |
| Granulated cane sugar | 83 |
| Fat mixture of Example I | 7 |
| Flavor, color, etc., as desired. | |

Example IV

|  | Per cent |
| --- | --- |
| Gelatinized corn starch powder (disrupted natural grains) | 25 |
| Granulated cane sugar | 68 |
| Fat mixture of Example I | 7 |
| Flavor, color, etc., as desired. | |

In the above formulas the amount of fat specified is preferred to be slightly above the amount given in the preferred compositions of the prior art, wherein 5% appears to be considered as optimum concentration. We find that we may readily vary the fat content from 5% to 8%, but 7% is an optimum concentration for the edible fat mixture of Example I. This is apparently due to the effect of the stearine becoming a solid on or in the sugar or starch particle, leaving the residual fat contents as the more liquid or semi-solid fat seal over the whole particle.

In working the above formulas commercially the following procedure is recommended: Use a large jacketed power mixer of from 800 to 2000 lbs. capacity with a double acting spiral agitator. Add the edible vehicle, whether it be sugar, starch, or a mixture, and heat to 125° F. with agitation.

The fat mixture of Example I may be made by first melting the hard fat, which is predominantly stearine, at about 145° F. The hydrogenated oil is then added and the mixture agitated rapidly while the added fat melts into the stearine. Then the oleo oil is added and thoroughly mixed in. Finally the lecithin is dissolved in the melted mixture. When the mixture is entirely melted, violent agitation for 30 minutes is practiced and continued until a temperature of about 128° F. is attained, which is near its melting point.

The first mixing need be only an approximate one where a coarse granulated sugar is used as or in the vehicle, and therefore no heating of the vehicle is essential. Ultimate distribution is effected in grinding the mass to comminute the sugar in the presence of the fat. This is permitted to raise the temperature of the mass to assure sufficient liquidity of the fat mixture to distribute the fat, and where very large masses are concerned cooling may even be desired. There is no necessity for and good reason not to allow overheating during grinding. Furthermore, it is desirable for the mixture being ground to attain a temperature above the congealing point of the fat mixture to assure its easy and uniform distribution over the old and newly formed vehicle particles. It is therefore most desirable to deliver the mixture from the mixer or grinding at a temperature below the melting point of its highest melting constituent (the stearine) and preferably at a temperature not in excess of the melting point of the fat mixture, and preferably above its congealing point. It may suitably be so ground that 98% passes an 80 mesh screen, 95% passes a 100 mesh screen, and at least 85% passes a 150 mesh screen.

A doughnut sugar made according to Example II, with the fat mixture of Example I having 7% oleo oil, gives entirely satisfactory attractive doughnuts, wrapped or unwrapped, at 60° F., or at 110° F., at low humidity or at high humidity, and under all or any ordinary atmospheric conditions for 36 hours or longer. This requirement of the trade has heretofore been impossible to meet.

Other edible fat mixtures for the invention are:

*Example V*

| | Parts by weight |
|---|---|
| Vegetable stearine (melting point 128°–140° F.) | 25 |
| Hydrogenated fat (melting point 98°–104° F.) | 70 |
| Oleo oil (Table I) | 5 |
| Lecithin | 0.15 |

Melting point, 125.6° F.
Congealing point, 111.0° F.

*Example VI*

| | Parts by weight |
|---|---|
| Vegetable stearine (melting point 138°–140° F.) | 30 |
| Hydrogenated fat (melting point 98°–104° F.) | 68 |
| Oleo oil (Table I) | 2 |

Melting point, 128.3° F.
Congealing point, 116° F.

*Example VII*

| | Parts by weight |
|---|---|
| Vegetable stearine (melting point 138°–140° F.) | 30 |
| Hydrogenated fat (melting point 98°–104° F.) | 65 |
| Oleo oil (Table I) | 5 |

Melting point, 127.1° F.
Congealing point, 113.9° F.

It has been observed that if the ground powder is delivered from the mill at a temperature above the melting point of the fat mixture employed, the powder cakes. If the mass is delivered from a grinder at a temperature below the congealing point of the fat mixture, some of the particles of the powder may lack the desired characteristics. The uniformity of distribution will be dependent upon the period in the grinding process where a sufficiently elevated temperature was attained to effect uniformity of distribution. Apparently, the grinder action at a temperature between the melting and congealing points assures a uniform coating of old and newly ground particles with a homogeneous mass of the fat mixture while it is unstable and about to separate into constituent parts. On arriving at a static condition the sugar or other particles of the mass become seeds or nuclei for the stearine to crystallize in or upon, thus forcing a lower melting mixture to the surface to prevent caking, and to give the desired surface properties. The warm mass delivered from the mixer or grinder may be allowed to cool slowly, thus to facilitate the desired movement of the oleo oil to the surface. It is to be understood that the grinding may be conducted so as to mix as well as grind.

Theoretically, it would seem that the large amount of hydrogenated cotton seed oil of the formulas might be omitted, but this is not practically so. It is desirable as bulk and because it is well known and recognized as a cooking shortening or fat, and is relatively less expensive. However, it seems to have a function. Attempts to use a formula of only the said oleo oil and vegetable stearine gave a highly rancid donut sugar. The mixing and grinding operation develops heat and access to air. These conditions highly favor rancidification. The bulk of hydrogenated cotton seed oil in the formula, with and without lecithin, prevents noticeable rancidification. This is either a matter of dilution of the oleo oil, or it is an effect of some property in the hydrogenated oil. It may well be that the latter, being still unsaturated but chemically altered, has a selective action for the oxygen in the apparatus or mixture, and in the finished product while cold or hot, to utilize the same less harmfully to the ultimate product.

The invention is not limited to use of incompletely hydrogenated vegetable oils of the melting point range 98° F. to 104° F. given above for cottonseed oil. Hydrogenated cottonseed oil of melting point 94° F. has been used. The preferred form however is that used commercially as a cooking fat, which ordinarily melts at 105° F. or below. Where a higher melting point fat is used the product is more of a specialty, but it may nevertheless be used. For example hydrogenated coconut oil melting around 110° F. may be used. But in such a modification it is advisable to cut down the amount of vegetable stearine, thus to keep the fat mixture adaptable for the process as described. The following formula illustrates such a variation in the major component of the fat mixture.

*Example VIII*

| | Parts by weight |
|---|---|
| Vegetable stearine | 25 |
| Hydrogenated coconut oil (melting point 110° F.) | 67 |
| Oleo oil (Table I) | 8 |

It will thus be seen that the invention is dependent upon the composition of the fat mixture, and that those skilled in the art will readily perceive of modifications and variations of the foregoing exemplary formulas.

In the first instance it must be recognized that commerce in edible oils and fats has not progressed to the state of the oil and hydrocarbon industry where fractions are more clearly cut and isolated. It is therefore necessary to use commercial forms which predominate in certain more or less specified ingredients. Thus, vegetable stearine predominates in pure stearine, ordinary cooking fat by hydrogenation of vegetable oils predominates in fat melting from 94° F. to 110° F., and usually is still more limited to fat melting from 98° F. to 104° F.; and oleo oil is of animal origin predominating in fat melting below 94° F. Use of commercial products rather than highly purified fractions thereof is an important object of the invention, and such uses are contemplated in the appended claims.

We claim:

1. An edible dusting powder for doughnuts, pies, cakes and fatty pastries, comprising an edible powder vehicle, and an edible fat mixture covering the particles of said powder, said fat mixture comprising 35 to 25 parts of vegetable stearine, 55 to 73 parts of incompletely hydrogenated vegetable oil of melting point from 94° to 110° F., and from 10 to 2 parts of oleo oil prepared from animal fat and having a melting point at roughly 94° F. and a congealing point of 64° F.

2. An edible dusting powder for doughnuts, pies, cakes and fatty pastries, comprising an edible powder vehicle, and an edible fat mixture covering the particles of said powder, said fat mixture comprising 35 to 25 parts of vegetable stearine, 57 to 70 parts of incompletely hydrogenated vegetable oil of melting point from 94° to 110° F., and from 5 to 8 parts of oleo oil prepared from animal fat and having a melting point at roughly 94° F. and a congealing point of 64° F.

3. A composition according to claim 1 in which 92 to 95 parts of particles selected from the group consisting of starch powder and sugar powder are coated with 8 to 5 parts of the fat mixture.

4. A composition according to claim 2 in which 92 to 95 parts of particles selected from the group consisting of starch powder and sugar powder are coated with 8 to 5 parts of the fat mixture.

CARROLL L. GRIFFITH.
LLOYD A. HALL.